(12) United States Patent
Johnson

(10) Patent No.: US 7,478,811 B2
(45) Date of Patent: Jan. 20, 2009

(54) WAVE DRIVEN GAMING APPARATUS

(76) Inventor: Garrett Johnson, 212 Rudee Ave., Virginia Beach, VA (US) 23451

( * ) Notice: Subject to any disclaimer, the term of this patent is extended or adjusted under 35 U.S.C. 154(b) by 276 days.

(21) Appl. No.: 11/193,858

(22) Filed: Jul. 29, 2005

(65) Prior Publication Data

US 2006/0022470 A1 Feb. 2, 2006

Related U.S. Application Data

(60) Provisional application No. 60/598,016, filed on Aug. 2, 2004.

(51) Int. Cl.
*A63B 71/00* (2006.01)
(52) U.S. Cl. .................................. 273/138.5
(58) Field of Classification Search ............... 273/138.5
See application file for complete search history.

(56) References Cited

U.S. PATENT DOCUMENTS

| | | | |
|---|---|---|---|
| 3,009,273 A | 11/1961 | Gessman | |
| 3,116,695 A | 1/1964 | Faller | |
| 3,425,152 A | 2/1969 | Foulkes | |
| 3,477,723 A | 11/1969 | Djedda | |
| 3,880,552 A | 4/1975 | Mason | |
| 3,973,771 A | 8/1976 | Schuman | |
| 4,296,602 A * | 10/1981 | Hales et al. | 60/398 |
| D270,362 S * | 8/1983 | de Gregorio et al. | D21/375 |
| D275,116 S * | 8/1984 | Mickens | D21/375 |
| 5,049,080 A | 9/1991 | Kriebel et al. | |
| 5,050,882 A * | 9/1991 | Yang | 273/144 B |
| 5,184,821 A * | 2/1993 | Korenek | 273/138.2 |
| 5,279,512 A | 1/1994 | Manale | |
| 5,647,983 A * | 7/1997 | Limcaco | 210/416.2 |
| 5,857,910 A * | 1/1999 | Watanabe et al. | 463/17 |
| 6,182,910 B1 | 2/2001 | Huen | |
| 6,210,113 B1 | 4/2001 | Ihrenberger | |
| 7,223,137 B1 * | 5/2007 | Sosnowski | 440/3 |
| 2005/0003885 A1 * | 1/2005 | Rhoten | 463/17 |
| 2005/0016815 A1 * | 1/2005 | Martin et al. | 194/317 |

* cited by examiner

*Primary Examiner*—Gene Kim
*Assistant Examiner*—Dolores Collins
(74) *Attorney, Agent, or Firm*—Williams Mullen; M. Bruce Harper

(57) ABSTRACT

A wave actuated gaming wheel is described as a device for entertainment. In a basic form, the invention includes a wave generator, a wave tank or pool, a wave energy captured device, and a specially adapted gaming wheel. The wave energy capture device is mounted in the path of the wave, positioned so as to interact with an oncoming wave. Paddles, cups, or pontoons, and other supporting structure are coupled or fixed to the gaming wheel to capture energy from the wave and to transfer it to the gaming wheel in the form of rotary motion. When the wave has passed, the transfer of energy terminates. Friction, energy losses, or a brake cause the gaming wheel eventually to come to a stop. As with conventional gaming wheels or "wheels of fortune," the circumference of the wheel may be divided into a plurality of distinct gaming partitions with symbols that represent a certain possibility for a winning outcome. Players or observers seek to predict which gaming symbol might fall along a pay line when the gaming wheel stops.

9 Claims, 6 Drawing Sheets

WAVE DRIVEN GAMING APPARATUS

CROSS REFERENCE TO RELATED APPLICATIONS

The present application claims priority from U.S. Provisional Application Ser. No. 60/598,016, filed on Aug. 2, 2004.

BACKGROUND OF THE INVENTION

1. Field of the Invention

The present invention relates to games of chance. In particular, the present invention is a method and device for actuating a gaming wheel by the motion of a wave.

2. Description of Related Art

Games of chance typically involve some form of uncertainty for the participant, which may be considered to be guessing or wagering on an unpredictable or uncontrolled outcome. This ordinary sense of lack of control or predictability is often introduced through some randomizing factor or device. In gaming, the outcome may appear to be random, although the pattern or distribution of outcomes may be predictable in the long run and may simply be dependent on some initial randomizing physical conditions or input. In some cases, the game of chance includes a factor of personal skill or participation, in addition to the randomizing influence.

One category of games of chance involves gaming wheels. Gaming wheels as amusement devices are relatively well known. Rotating gaming wheels are seen in games such as roulette, wheels of fortune, slot machines, and other games of chance. Carnival gaming wheels are widespread, and the randomizing conditions may include the relative radial starting point, the energy imparted by the force of spin, and other physical characteristics of the device, such as friction or balance. The "big six" game or "wheel of fortune" typically includes 54 radial slots or divisions about the circumference of the wheel and each slot has a symbol. Following rotation the wheel's pointer or "pay line" lands on or points to a particular slot or division and its symbol. This represents the winner for those who wagered on that symbol. In a more complicated example, U.S. Pat. No. 5,184,821 to Korenek discloses a game wheel having 53 card images about its circumference of a wheel, along with several smaller wheels, enabling the play of various card games. Because this game may involve strategy and familiarity with probability of outcome, the Korenek device introduces an element of skill.

Other games of chance that include an element of skill may involve the aiming of some projectile or water stream from a water nozzle (e.g. water-pistol) to a target. An example of a personal version of such a game is provided in the amusement device of U.S. Pat. No. 3,477,723. In an example of a competitive version of these games, contestants may direct a stream of water at one or more randomly presented targets. The contestant with the greatest recorded accuracy during a given time period or volume of water is the winner of some prize. Success may be gauged by the recorded number of targets hit.

One invention extracts energy from a flow of water to enable a spring to drive a personal game of chance. U.S. Pat. No. 6,182,910 to Huen disclosed a shower head or unit where a plurality of labeled (e.g., numbered) rotatable cylinders or wheels are visibly disposed within a shower head. When the shower is activated, the water pressure imparts energy to a coil spring through a pressure plate, engaging a clutch. When the water flow is stopped, the clutch is released and the energy in the spring spins the cylinders, which then display an outcome of three numbers in the shower head. The randomizing conditions in this case may include the starting point of the cylinders, the energy imparted by stream, and other physical characteristics of the device.

An object of the present invention is to provide a gaming wheel in a different and open water environment, having a novel energy source that is consistent with a water theme.

SUMMARY OF THE INVENTION

The present invention is a wave driven gaming apparatus. In particular, the present invention is a method and device for actuating a gaming wheel by the motion of a wave.

The present invention captures the energy from a wave as the motive and randomizing condition for gaming wheels. Most ocean waves are the product of wind, gravity, and atmospheric pressure; the shape of the swell represents a mixture of potential and kinetic energy. In deep water, a generating force such as the wind can cause a swell (potential energy) where disturbed water molecules move in a generally circular orbit (kinetic energy.) The lateral motion of the molecules disturbs adjacent water molecules, transferring energy so as to communicate energy along the direction of the wave. In shallow water, or depths of around one-half the wave length, friction causes the orbits to become stretched flat or elliptical. The wave typically slows, the wave length decreases, and the height increases while the wave period remains constant. As the depth continues to decrease (i.e., for a somewhat horizontal but inclining shore), the wave form breaks down and releases its energy in a variety of ways, including the dispersing of water in currents or smaller waves that move in the direction of energy transfer in a somewhat horizontal wash.

Wave energy capture devices seek to capture the energy from ocean waves and translate the energy into a form useful for human consumption. Most of these devices focus on the energy in vertical tidal changes or in the vertical motion of deep water swells, because the horizontal movement of water in waves is negligible until the wave reaches shallow water. However, kinetic energy due to horizontal water movement in tides, shallow water waves, or other currents has been used to drive marine turbines and other energy capture devices.

In some locations or bodies of water, waves are uncommon or unavailable. Various methods and devices for the generation of waves for wave pools and other uses have been developed. Generally, these waves behave like shallow water waves, approaching a somewhat horizontal but inclining shore. For example, U.S. Pat. No. 5,833,393 to Carnahan, et al., described an effective wave generator based on the release of compressed air underwater. The compressed air is released using one or more tubes or wave cannons. This patent is incorporated hereto in its entirety. In another example, U.S. Pat. No. 6,019,547 to Hill includes an airfoil and chute to produce a surf-able wave. Such technologies have supported a growing number of amusement facilities. In general, because of the environment and the nature of the agitation, the waves generated from these devices involve more lateral water motion than is demonstrated in deep water swells.

Thus, one aspect of the present invention is the introduction of elements of gaming and energy capture into recreational wave generation. In particular, the present invention uses the motion of waves for gaming. Gaming, or playing a game of chance for money or other property, has been historically confined to conventional venues or gaming facilities. In recent years, more gaming facilities have been assuming attributes of theme recreational parks; some casinos feature animals or creative spectacles. The present invention discloses use of the motion of a wave to actuate a gaming wheel for a novel experience.

In a first embodiment, a wave generator and a wave tank or pool are configured to produce waves, whether solely for observation or for some degree of water play by individuals. A gaming wheel is coupled with or connected to an energy capture device that enables it to be actuated by the motion of a wave. The gaming wheel and energy capture device may be rotatably mounted in the path of the wave, positioned so as to present a portion of the wheel to the oncoming wave. Paddles, cups, or pontoons, and other supporting structure of the energy capture device are coupled or connected to the gaming wheel to capture energy from the wave and to transfer it to the wheel in the form of rotary motion. When the wave has passed, the transfer of energy terminates; friction, energy losses, or a brake cause the gaming wheel eventually to come to a stop. As with conventional gaming wheels or "wheels of fortune," the circumference of the wheel may be divided into a plurality of distinct gaming partitions or portions with symbols that represent a certain possibility for a winning outcome. Players or observers seek to predict which gaming symbol might fall into alignment with one or more predetermined positions when the wheel stops.

BRIEF DESCRIPTION OF THE DRAWINGS

A more complete description of the subject matter of the present invention and the advantages thereof, can be achieved by the reference to the following detailed description by which reference is made to the accompanying drawings in which.

Figure 1:
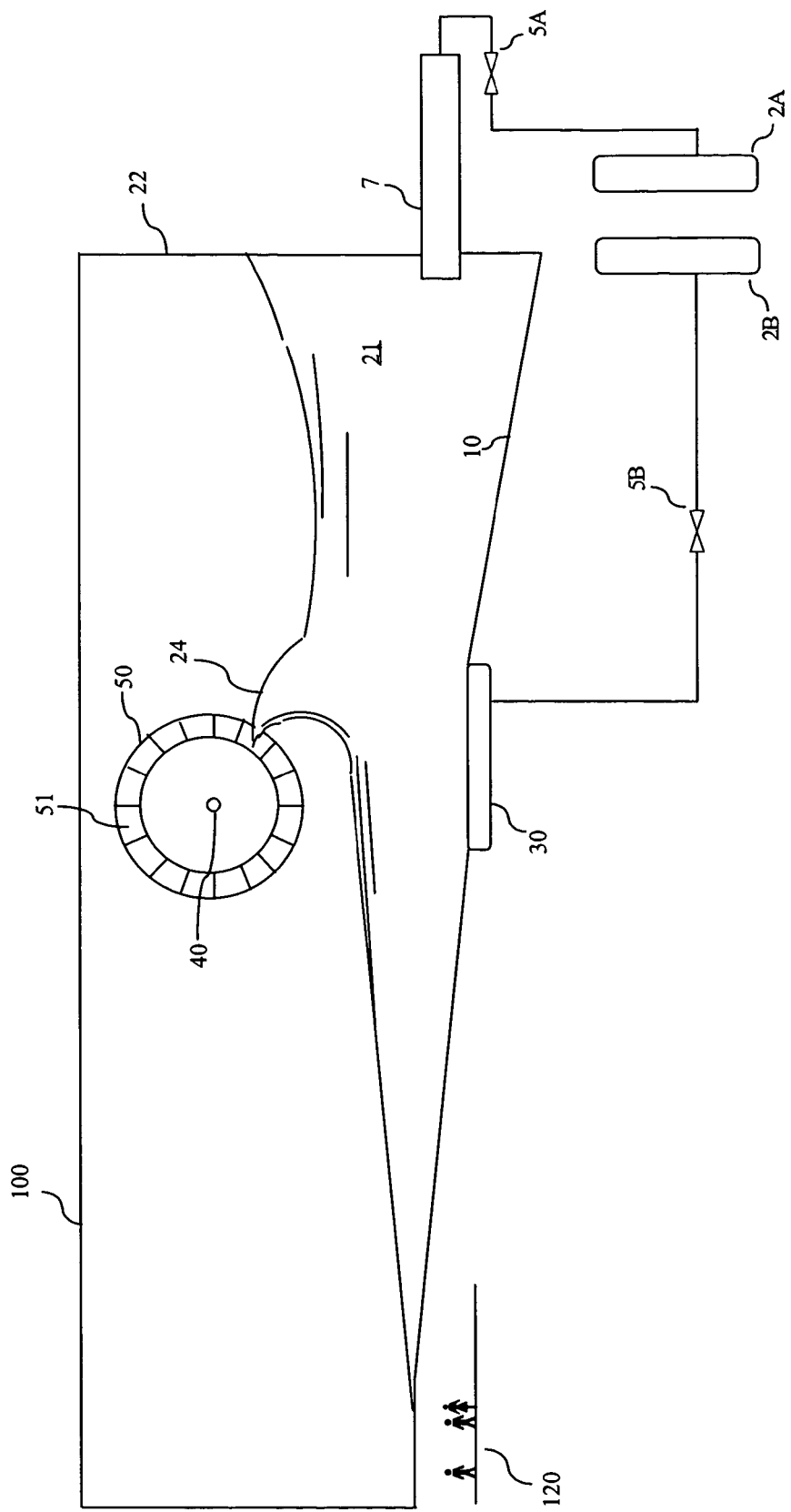
FIG. 1 is a view of a larger embodiment of the present invention with a "wheel of fortune" style gaming wheel, suitable for viewing by spectators.

Element List:
2 storage tank
2A storage tank associated with wave cannon
2B storage tank associated with artificial reef
5 control valve
5A control valve associated with wave cannon
5B control valve associated with artificial reef
7 wave cannon
10 bottom of the body of water
16 check valve
21 body of water
24 wave
30 artificial reef
40 shaft
41 bearing
42 strut
50 gaming wheel
51 gaming wheel partition
52 symbols
60 energy capture device
61 paddle
62 bucket
64 vane
65 chute
66 servomechanism
70 pay line
80 water pulse cannon
81 water storage tank
82 air storage tank
85 air control valve
86 water control valve
87 water check valve
88 pulse cannon release valve
100 wave pool
120 observation area

DETAILED DESCRIPTION

The following detailed description is of the best presently contemplated modes of carrying out the invention. This description is not to be taken in a limiting sense, but is made merely for the purpose of illustrating general principles of embodiments of the invention.

With reference to the drawings, FIG. 1 shows a side view of a relatively large but simple embodiment of the present invention. Gaming wheel 50 is shown as a wheel of fortune style wheel rotatably mounted on shaft 40 within a large wave pool 100 containing body of water 21. Optional and illustrative observation area 120 is provided for spectators. Control valve 5A is used to release compressed gas from storage tank 2A to wave cannon 7, creating wave 24 within body of water 21. In this embodiment, optional artificial reef 30 provides some control of waves within wave pool 100 by altering the profile of bottom of the body of water 10, also as described in U.S. Pat. No. 5,833,393 to Carnahan. Gaming wheel 50 includes energy capture device 60 (not shown) for capturing the breaking and wash energy of wave 24, in this example a vitruvian or undershot water wheel embodiment. Those skilled in the art may configure the size of the bottom of the body of water 10 of wave pool 100 such that the water dissipating when wave 24 breaks or decomposes results in a water level of return wash that is lower than gaming wheel 50 and its energy capture device 60 (not shown.) Alternatively, unidirectional devices as are commonly known in the art, such as a locking ratchet and pawl or strut, may hold gaming wheel 50 in position during any back wash contacting energy capture device 60.

Figure 2C:
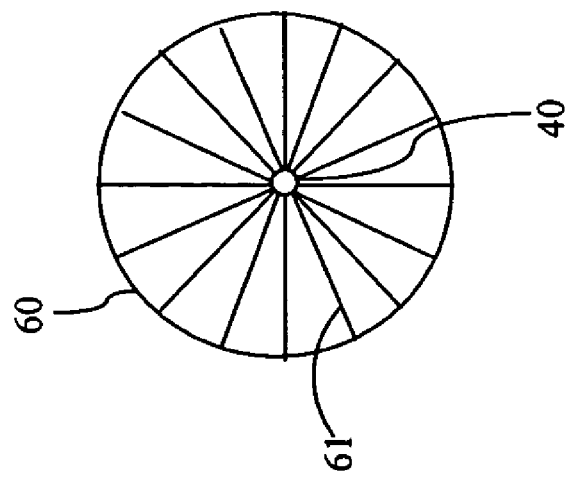
FIG. 2c is a back view detail showing an energy capture device of the present invention.
Figure 2B:
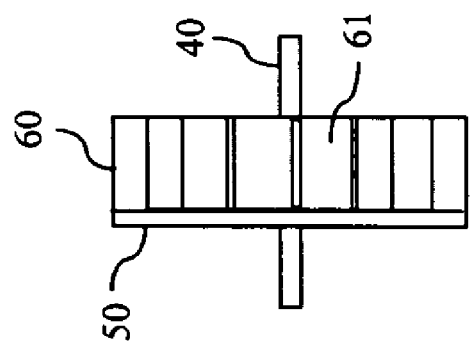
FIG. 2b is a side view detail of the gaming wheel and wave energy capture device.
Figure 2A:
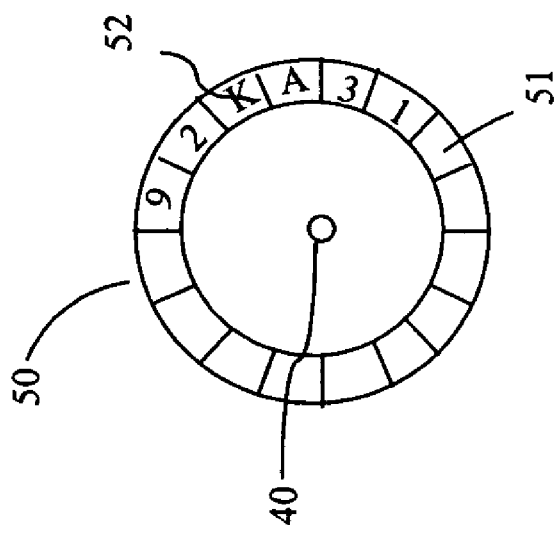
FIG. 2a is a front view detail of the gaming wheel in FIG. 1.

FIG. 2 provides details of gaming wheel 50 and energy capture device 60 of FIG. 1. FIG. 2A is a front view of gaming wheel 50 with partitions 51 provided for the reception of gaming symbols 52 or images. The number of partitions 51 and the type of symbols 52 or characters may be any collection desired, such as traditional "big six" gaming numbers, currency denominations, racing horse numbers, playing card, the pips of a die face, etc.

FIG. 2B is a side view of gaming wheel 50 fixed to energy capture device 60. Illustrated within this perspective is energy capture device 60, which in this example is a water wheel fixed to gaming wheel 50 such that they rotate together on shaft 40. The means for fixing energy capture device 60 to gaming wheel 50 may be any one of those known in the art, such as fasteners, couplings, clamps, integrated construction, etc. Paddles 61 are intended to capture the energy of water streaming by in a roughly tangential direction in the form of wave 24, communicating the energy of wave 24 into rotational motion of energy capture device 60. Those skilled in the art will recognize the ability to also use cups, floats, buckets, vanes, propellers, etc., depending on the use.

Figure 5:
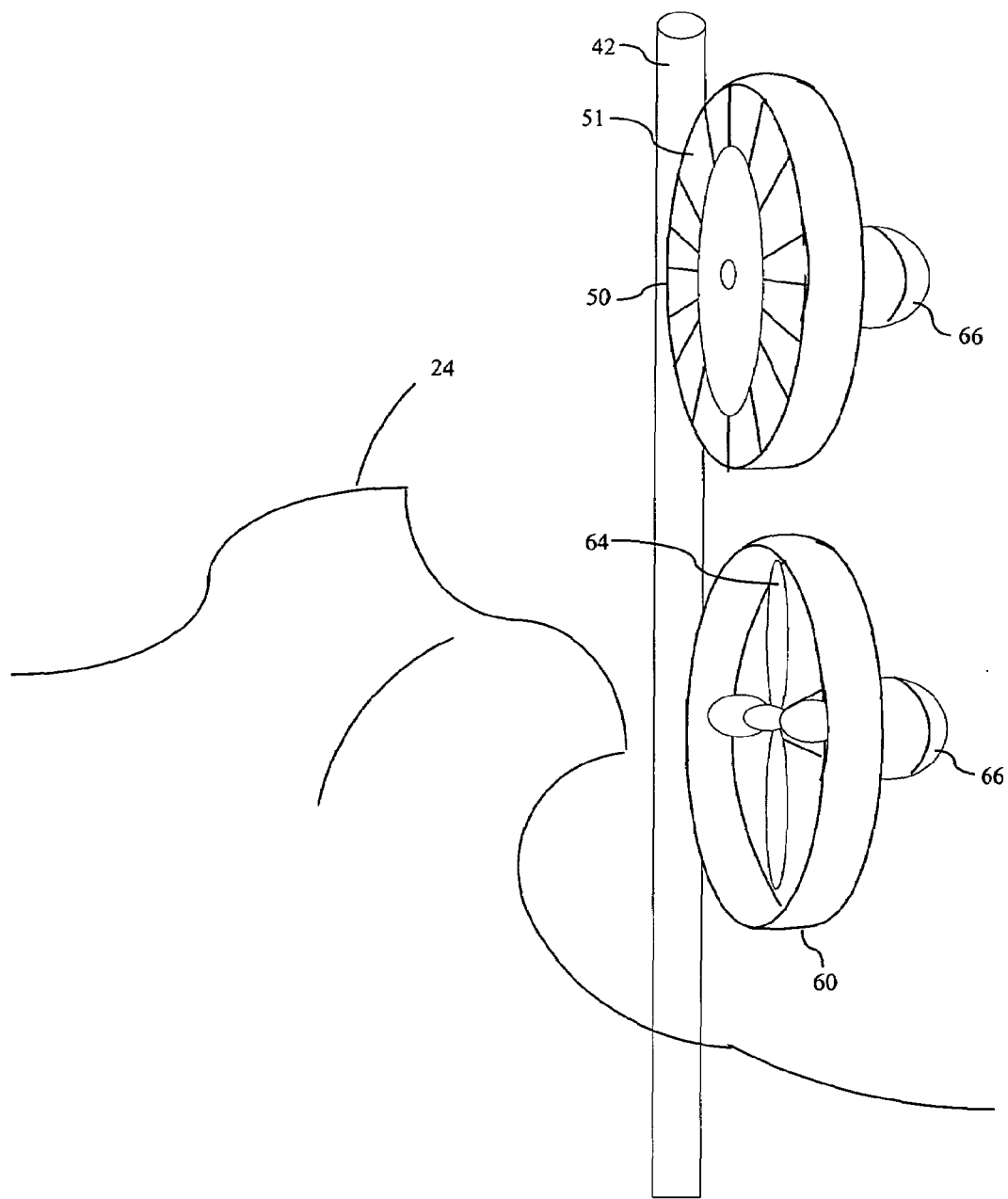
FIG. 5 is a portion of an embodiment with a flow through turbine as an energy capture device.

This simple arrangement shows energy capture device 60 as a companion water wheel mounted rotatably onto shaft 40 along with and fixed to gaming wheel 50. The mechanical structure may take a wide range of forms. In an alternative embodiment, gaming wheel 50 may be driven by energy capture device 60 through gearing so as to capture and communicate energy without exposing gaming wheel 50 to contact by or proximity with water. Other devices for capturing wave energy may be employed as well, so long as they can be adapted to rotate gaming wheel 50 in a fashion similar to that in the game of concern. For example, a barrage, dam, or wave chamber that collects incoming waves and forces air out an exhaust in order to drive a windmill or turbine would function if such a turbine were coupled or connected to gaming wheel 50. This coupling may be by shaft, belt, chain, gearing, or synchro/servomechanisms 66. An oscillating water column system could drive a float, which may then be coupled or connected to drive gaming wheel 50. Alternatively, the shaft of a water current driven turbine, such as an open cage multi blade hydrofoil design, could be coupled or connected to gaming wheel 50. Those skilled in the art will readily see that energy capture device 60 may also be horizontally and rotatably mounted, supporting either a horizontal or vertical gaming wheel 50. FIG. 5 illustrates a potential configuration where energy capture device 60 is a flow through water turbine and gaming wheel 50 is connected to energy capture device 60 electrically via servomechanisms 66. The wave path may be of a variety of configurations, such as circular or tangential, so long as it impacts energy capture device 60 as needed by its design. Further, energy capture device 60 may be adapted for overshot flow, undershot flow, impact, or flow through water motion. Those skilled in the art of entertainment will recognize a benefit for some embodiments in preserving the visibility of energy capture device 60 so as to demonstrate the integrity of the randomized effect on operation of gaming wheel 50.

Gaming wheel 50 may be a variety of sizes. In one embodiment, as shown in FIG. 1, wave pool 100 may be predominantly a spectator activity where the components are large enough to enable many to view gaming wheel 50 and to play the game provided. The theme of such an embodiment may be that of a giant wave. In a different embodiment, gaming wheel 50 may be smaller and the game adapted for a smaller group of viewers, possibly in the proximity of the invention while the viewers themselves may be located within wave pool 100. Those skilled in the art will acknowledge that energy capture device 60 may be adapted to the nature of the application, including the desired size and attendant weight of gaming wheel 50.

In another embodiment, three gaming wheels 50 may be combined to simulate the action of the slot reels in a slot machine, such that the slot reels are rotated by three energy capture devices 60. The slot reels in a traditional slot machine have some quantity of images (e.g., sixteen or twenty-four fruits, names, or shapes such as bells, diamonds, or hearts) displayed about their circumference. Success or failure is determined by the collection of images from the reels that are displayed along a line after the game has been played. To play, an individual pulls a handle to actuate intricate gearing or electric motors that rotate the reels about a shaft or otherwise give the appearance of rotation. The slot machine brakes each of the individual reels at different times, displaying a collection of images.

Figure 3:
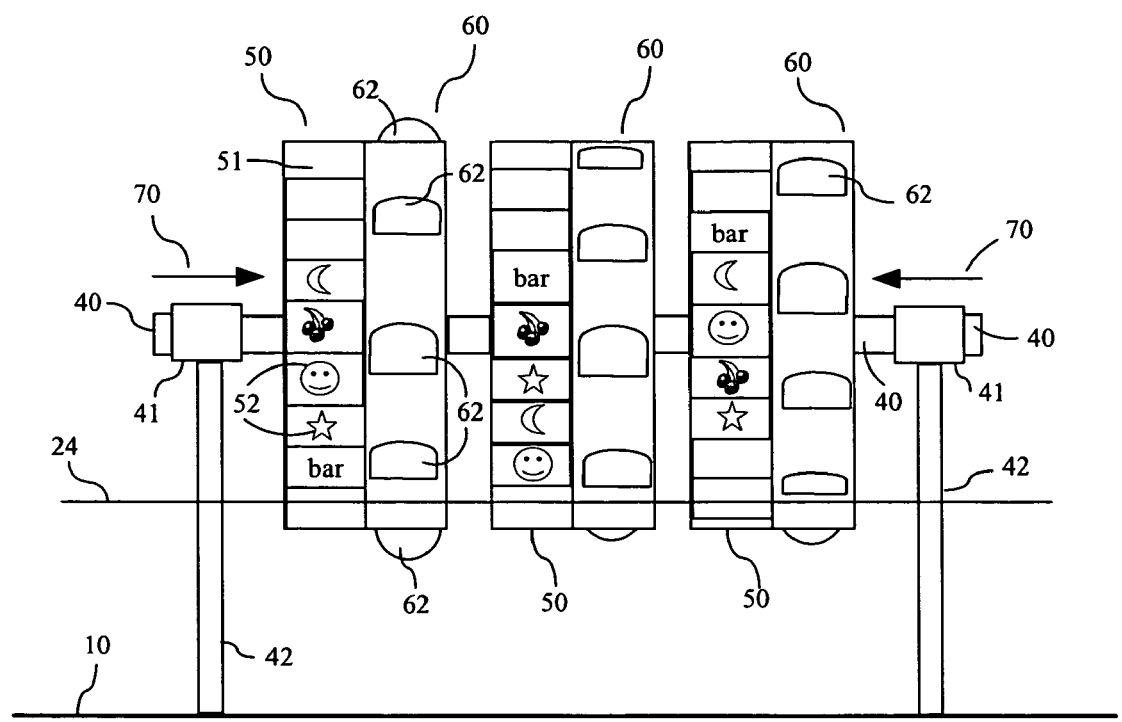
FIG. 3 is a slot machine simulation embodiment of the present invention, having three gaming wheels.

With reference to FIG. 3, this embodiment may provide a plurality of gaming wheels 50, rotatably mounted on shaft 40. In a simple example, gaming wheels 50 may each be fixed, connected, or coupled to an energy capture device 60, also rotatably mounted onto shaft 40. A single energy capture device 60 may be used, so long as there is appropriate gearing or equipment to ensure that the three gaming wheels 50 rotate and brake appropriately. Shaft 40 is shown mounted within bearings 41 supported by struts 42. As shown in FIG. 3, this example of energy capture devices 60 include buckets 62 for collecting kinetic energy of water wave 24. Struts 42 may be sized for optimal encounter of energy capture device 60 with wave 24. A pay line 70 is provided for when gaming wheels 50 come to a stop. Pay line 70 is the point at which a gaming wheel partition 51 is considered to be within the final collection of displayed images for determining success or failure. This pay line 70 may also be provided by cutout windows, lighting (internal or external), framing, pointers, or other such devices customary for slot machines. It is contemplated that such multiple wheel arrangements will also be well suited for certain card games, such as blackjack or poker.

Figure 4:
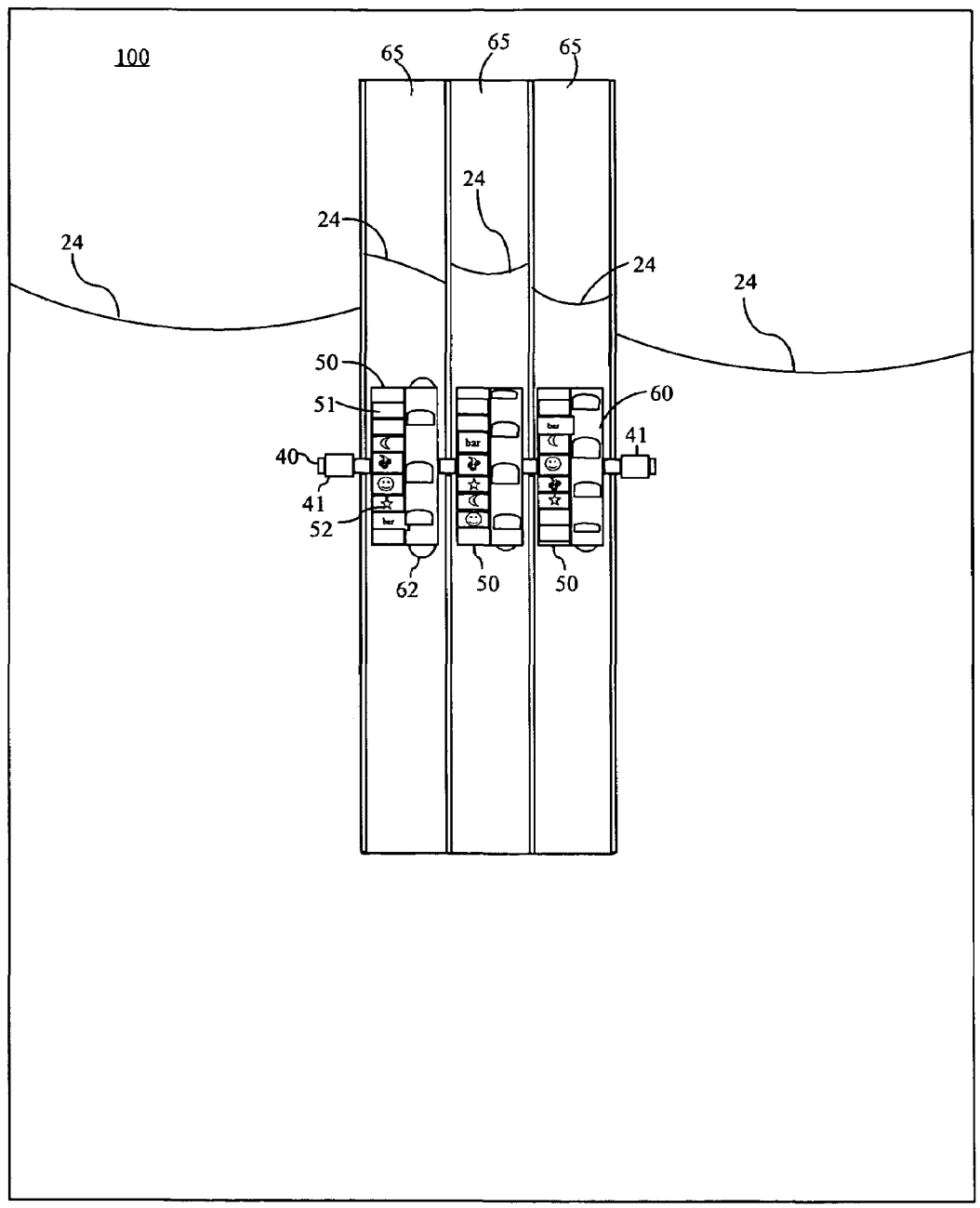
FIG. 4 is a top view detail of a slot machine simulation embodiment of the present invention, including dividing chutes.

The braking action and independence of rotation may be effected in any one of a variety of approaches. The example shown in FIG. 4 is a top view of the slot machine embodiment shown in FIG. 3. Wave 24 is separated by one or more flumes or chutes 65 that channel water separately to the three energy capture devices 60, independently rotating each of gaming wheels 50 with a different levels of energy. Variations in the length, surface treatment, obstructions, incline, etc., among the chutes 65 may contribute to differences in the energy of the portions of wave 24 within each of chutes 65 upon reaching energy capture device 60. This variation will cause a different energy of spin for each gaming wheel 50, contributing a randomizing condition. Alternatively, mechanical brakes, variation in structure for energy capture device 60, or other approaches may lead to various energies of spin for each of gaming wheels 50.

Figure 6:
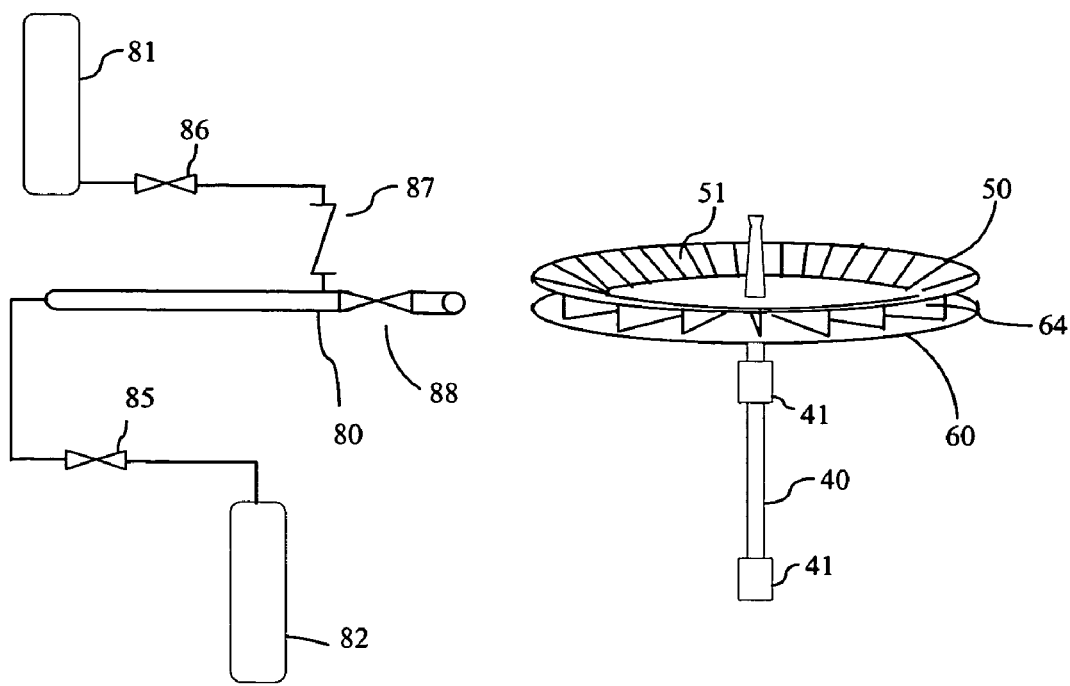
FIG. 6 is a roulette wheel embodiment of the present invention.

Smaller gaming devices may be used, where a gaming wheel 50 might be actuated by smaller water cannons 7, water nozzles, or devices that generate a pulse of water or a truncated stream. For example, in FIG. 6 wave pulse cannon 8 may be filled or loaded with water, then pressurized by a release of compressed gas so as to force the water out in a pulse. Gaming wheel 50 is configured to rotate horizontally about shaft 40 to simulate a roulette game. Wave pulse cannon 8 produces a pulse of water that impacts vanes 64 of energy capture device 60 at an angle approaching a tangent, so as to impart rotational motion to gaming wheel 50. Water storage tank 81, water control valve 86, and water check valve 87 are the water supply. Air storage tank 82 and air control valve 85 are a pressurized air supply, so that when release valve 88 is opened a pulse of water is released.

Many improvements, modifications, and additions will be apparent to the skilled artisan without departing from the spirit and scope of the present invention as described herein and defined in the following claims.

What is claimed is:

1. A gaming device, comprising:
   a body of water;
   a rotatable gaming wheel having a plurality of viewable partitions adapted to display a plurality of gaming symbols;
   at least one pay line located at a predetermined position with respect to the plurality of partitions to form a gaming wheel;
   a wave generating device, configured so as to be capable of generating a water wave having energy within the body of water; and
   a water wave energy capture device disposed within the body of water, driveably connected to the gaming wheel, and configured so as to capture energy from the wave in the body of water and to rotate the gaming wheel with a randomized effect.

2. The gaming device of claim 1, further comprising at least one additional rotatable gaming wheel and wherein the gaming wheels are configured so as to simulate a slot machine.

3. The gaming device of claim 1, wherein the water wave energy capture device is a water wheel.

4. The gaming device of claim 1, wherein the water wave energy capture device is a water driven turbine.

5. The gaming device of claim 1, wherein the water wave energy capture device comprises a wave chamber and an exhaust air driven turbine.

6. The gaming device of claim 1, wherein the wave energy capture device further comprises at least two servomechanisms for rotating the gaming wheel.

7. The gaming device of claim 1, wherein the wave generating device is a wave cannon.

8. A gaming device, comprising:
a rotatable gaming wheel having a plurality of symbols and a pay line;
a water supply;
a compressed gas supply;
a water pulse generator connected to the water supply and the compressed gas supply, configured to generate a pulse of water having energy from the release of compressed gas; and
a water pulse energy capture device driveably connected to the gaming wheel, for capturing energy from the pulse of water and communicating the energy to the gaming wheel with randomized effect to impart rotary motion.

9. The gaming device of claim 8, further comprising at least one additional rotatable gaming wheel and wherein the gaming wheels are configured so as to simulate a slot machine.

* * * * *